(12) United States Patent
Yamashita

(10) Patent No.: US 7,271,922 B2
(45) Date of Patent: Sep. 18, 2007

(54) PRINTING APPARATUS FOR CONTROLLABLY PRINTING DOCUMENTS OUTPUTTED FROM A DISTRIBUTION TERMINAL TO A DISTRIBUTION RECEIVER AS WELL AS PRINTING SYSTEMS AND METHODS RELATED THERETO

(75) Inventor: Hiroshi Yamashita, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 941 days.

(21) Appl. No.: 09/798,394

(22) Filed: Mar. 2, 2001

(65) Prior Publication Data

US 2001/0019425 A1    Sep. 6, 2001

(30) Foreign Application Priority Data

Mar. 3, 2000    (JP) .............................. 2000-059287

(51) Int. Cl.
*G06F 3/12*    (2006.01)
*G06F 15/00*    (2006.01)

(52) U.S. Cl. ..................................... 358/1.1; 358/1.15
(58) Field of Classification Search ........ 358/1.1–1.18; 710/7, 8, 33, 46
See application file for complete search history.

(56) References Cited

U.S. PATENT DOCUMENTS 6,522,421 B2 *    2/2003    Chapman et al. .......... 358/1.15
6,943,907 B1 *    9/2005    Kim .......................... 358/1.14

FOREIGN PATENT DOCUMENTS

| JP | 7-162590 | 6/1995 |
| JP | 7-240847 | 9/1995 |
| JP | 08-123641 | 5/1996 |
| JP | 10-235974 | 9/1998 |
| JP | 2001-251470 | 9/2001 |

* cited by examiner

*Primary Examiner*—Douglas Q. Tran
(74) *Attorney, Agent, or Firm*—David G. Conlin; William J. Daley, Jr.; Edwards Angell Palmer & Dodge LLP

(57) ABSTRACT

A printing apparatus suitable for secret document distribution by means of net distribution is provided, the printing apparatus having a control section for transmitting a distribution mail including specific distribution information to distribution receivers when a printing job for net distribution is received thereby, where the control section is adapted to output the printing documents only when the distribution information is included in printing instructions.

26 Claims, 11 Drawing Sheets

FIG. 5

| JOB DATA | DISTRIBUTION SENDER'S DATA | MARK | DISTRIBUTION RECEIVER'S DATA |
|---|---|---|---|
| NAME:M-WORD | Ad;AA@XX.YY.ZZ | * | Ad;BB@XX.YY.ZZ<br>Ad;CC@XX.YY.ZZ<br>Ad;DD@XX.YY.ZZ |

(an example of a distribution mail)

```
A message from Printer PR1                                    ⎫
  Here is printing data for Mr. B from Mr. A                  ⎬ M0
  <AA@XX.YY.ZZ>                                               ⎭

Job ID: PR1-001      Users' ID : PR1001BB                 ⎫
    Job Name: M-WORD     Portrait 10 pages                    ⎬ M1
    Sheet size: A4                                            ⎭
  ─────────────────────────────────────────────────────
        (Current Setting)    (Alteration)                     ⎫
        Print: Necessary     [ ]Unnecessary                   ⎪
        Both Sides: One Side                                  ⎪
                             [ ]Both Faces   [ ]Both Faces    ⎬ M2
                                 Long Sides     Short Sides   ⎪
                                                              ⎪
        N-UP: 1UP            [ ]2UP [ ]4UP                    ⎭
  ─────────────────────────────────────────────────────
Returning this mail without alteration starts the printout    ⎫
in the above setting. If you need any alteration, please put  ⎬ M0
"*" mark inside the [ ].                                      ⎭
Eg. Both Sides: One Side    [*]Both Faces   [ ]Both Faces
                                Long Sides      Short Sides
```

FIG. 7

| JOB ID | Ad OF DISTRIBUTION SENDING PC | DISTRIBUTION SENDER'S ID | Ad OF DISTRIBUTION RECEIVING PC | DISTRIBUTION RECEIVER'S ID | PRINTING STATUS |
|---|---|---|---|---|---|
| PR1-001 | AA@XX.YY.ZZ | PR1001AA | BB@XX.YY.ZZ | PR1001BB | PRINTED |
|  |  |  | CC@XX.YY.ZZ | PR1001CC | NOT NECESSARY |
|  |  |  | DD@XX.YY.ZZ | PR1001DD | TIME OUT |

T1

F I G. 8
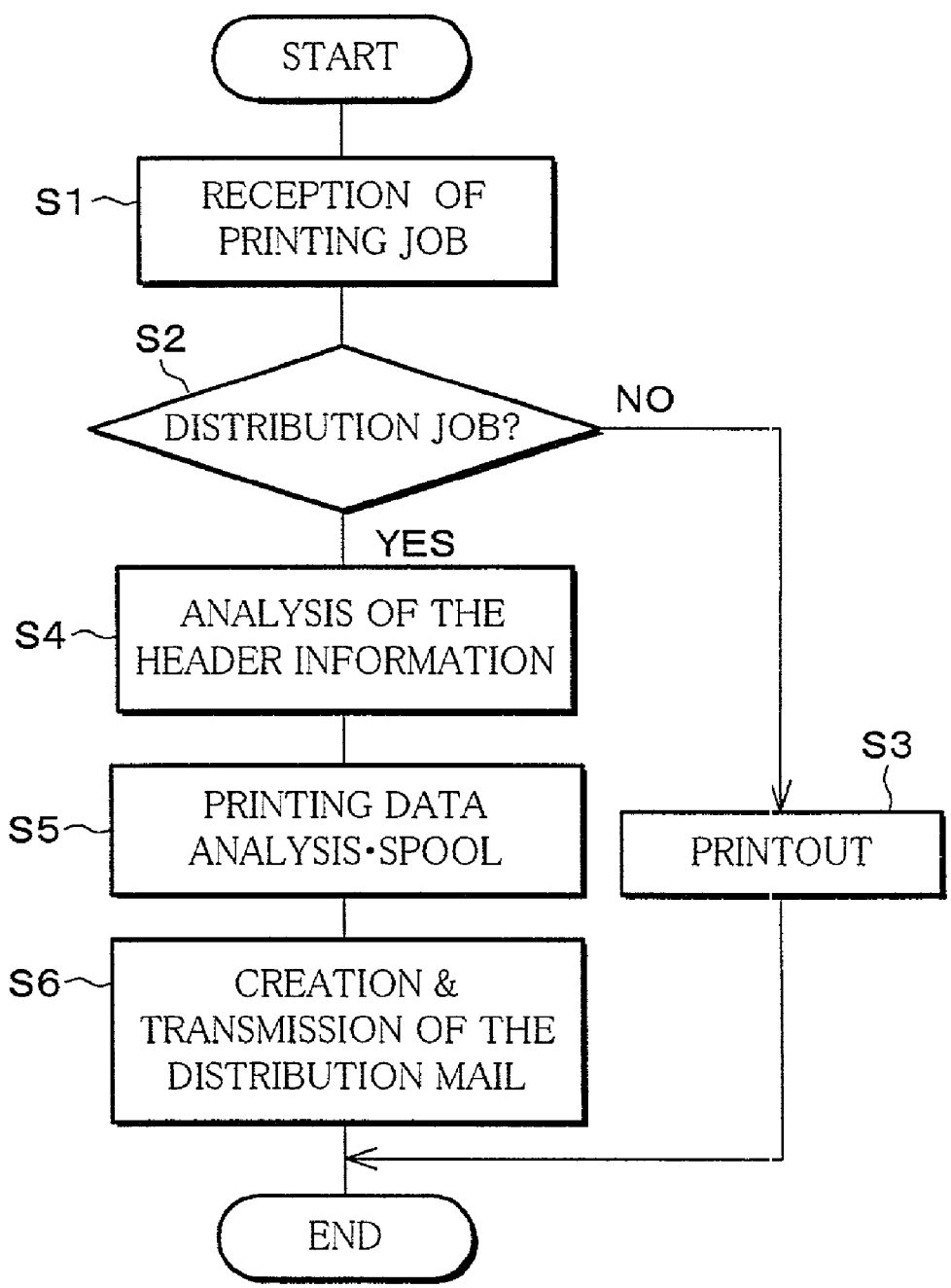

FIG. 10

(an example of a printing status mail)

```
A message from Printer PR1                              ⎫
  The distribution of the distribution job transmitted  ⎬ M10
  from Mr. A is now completed.                          ⎭

Job ID: PR1-001  Users' ID : PR1001AA               ⎫
    Job Name: M-WORD  Portrait 10 pages                 ⎬ M11
    Sheet size: A4                                      ⎭
  ----------------------------------------------------
    [ ]Confirm the distribution status of               ⎫
       the distribution job.                            ⎬ M12
    [ ]Delete the distribution job.                     ⎭
  ----------------------------------------------------
Returning this mail with "*" mark inside the [ ],       ⎫
the requested process is carried out.                   ⎬ M10
Eg. [*]Confirm the distribution status of               ⎭
     the distribution job.
```

FIG. 11

| JOB ID | : P R 1 - _ _ _ _ _ _ |
|---|---|
| USER'S ID | : _ _ _ _ _ _ _ _ _ |

| PRINTING | PRINTING (FORMAT ALTERATION) | NO PRINTING |

PRINTING APPARATUS FOR CONTROLLABLY PRINTING DOCUMENTS OUTPUTTED FROM A DISTRIBUTION TERMINAL TO A DISTRIBUTION RECEIVER AS WELL AS PRINTING SYSTEMS AND METHODS RELATED THERETO

FIELD OF THE INVENTION

The present invention relates to a printing apparatus that outputs images in accordance with a printing job transmitted from a terminal interconnected by means of a network, a printing system including the printing apparatus, and a printing method employed by the printing apparatus.

BACKGROUND OF THE INVENTION

Conventionally, a printing system where terminals, such as personal computers and workstation, are connected with printers (printing apparatuses) by using a network has been in use. In such a system, the printers are adapted not only for printout according to a printing job transmitted from a terminal, but also for informing the terminal of the completion of the printout.

Moreover, in a system with a plurality of terminals, documents may be distributed among the users at the terminals via printers (Net Distribution). Usually, net distribution is adapted so that the printing job for printing out the documents for the distribution is transmitted to the printers, and a message (a Distribution Message) is delivered to the terminals of the distribution receivers to request them to pick up the documents to be output at the printers.

A system for this type of net distribution is disclosed, for example, in Japanese Unexamined Patent Publication Tokukaihei No. 7-162590 (published on Jun. 23, 1995), in which, for easy net distribution, the transmission of a distribution message to the terminals of distribution receivers, as well as the output of documents, is performed by the printer receiving a printing job. The system is also arranged so that a printing job may be spooled inside the printer, adjourning the printout of documents.

The system described in the foregoing publication, however, has no means to protect the printing job spooled inside the printer. Therefore, even a person other than the users at the terminals which received the distribution message may be able to output the documents by using the printing job spooled inside the printer. This makes net distribution unsuitable for the distribution of secret documents such as important documents and confidential letters and the like which must be delivered to specified distribution receivers.

SUMMARY OF THE INVENTION

In view of the foregoing conventional problem, the present invention is made in order to solve the problem, and its object is to realize secret document distribution by means of net distribution.

To achieve the object, a printing apparatus of the present invention (the present printing apparatus), which is for receiving a distribution job in accordance with the printing documents to be distributed to specific distribution receivers, from a terminal connected thereto via a network, and for performing the output of the printing documents in accordance with the distribution job, includes an input section for receiving instructions from the distribution receivers, and an output section for outputting the printing documents in accordance with the distribution job when printing instructions including specific information are inputted into the input section.

The present printing apparatus is interconnected with terminals such as personal computers and workstation and the like via a network, and is adapted to perform printout in accordance with a distribution job transmitted from the terminals.

The expression "distribution job" denotes a printing job for the printing documents to be distributed to specific distribution receivers. Thus, the present printing apparatus is adapted to output printing documents for specific distribution receivers according to a distribution job, thus satisfying the requirements of net distribution, that is, the distribution of documents by using printing apparatuses in a network.

Particularly, the present printing apparatus is also adapted to perform the printout by the output section only when printing instructions including specific distribution information are inputted into the input section by the distribution receivers. The distribution information may be, for example, user's names or IDs to identify distribution receivers, job names or IDs given to distribution jobs, or the like information that can be the key word for specific distribution jobs. Thus, in the present printing apparatus, printing documents cannot be obtained without inputting the distribution information, i.e., the key word. This prevents the acquisition of the printing documents by users out of the net distribution. Therefore, even secret documents (important documents and confidential letters or the like) which are to be delivered only to specific distribution receivers may be distributed by using net distribution. Furthermore, a printing system for secret document distribution by net distribution may be constructed by connecting the present printing apparatus with a plurality of terminals by means of a network.

For a fuller understanding of the nature and advantages of the invention, reference should be made to the ensuing detailed description taken in conjunction with the accompanying drawings.

BRIEF DESCRIPTION OF THE DRAWINGS

FIG. 5 is an explanatory diagram showing a structure of a header of the distribution job transmitted to the printer shown in FIG. 1.

FIG. 6 is an explanatory diagram showing an example of a distribution mail transmitted from the printer shown in FIG. 1.

FIG. 7 is an explanatory diagram illustrating a configuration of a job administrative table created in the printer shown in FIG. 1.

FIG. 8 is a flow chart explaining a receiving operation for a printing job by the printer shown in FIG. 1.

FIG. 10 is an explanatory diagram showing a configuration of a printing status mail sent from the printer shown in FIG. 1.

FIG. 11 is an explanatory diagram showing an input panel provided to the display device of the printer shown in FIG. 1.

DESCRIPTION OF THE EMBODIMENTS

Described below is an explanation of one embodiment of the present invention with reference to FIGS. 1 through 11.

Figure 2:
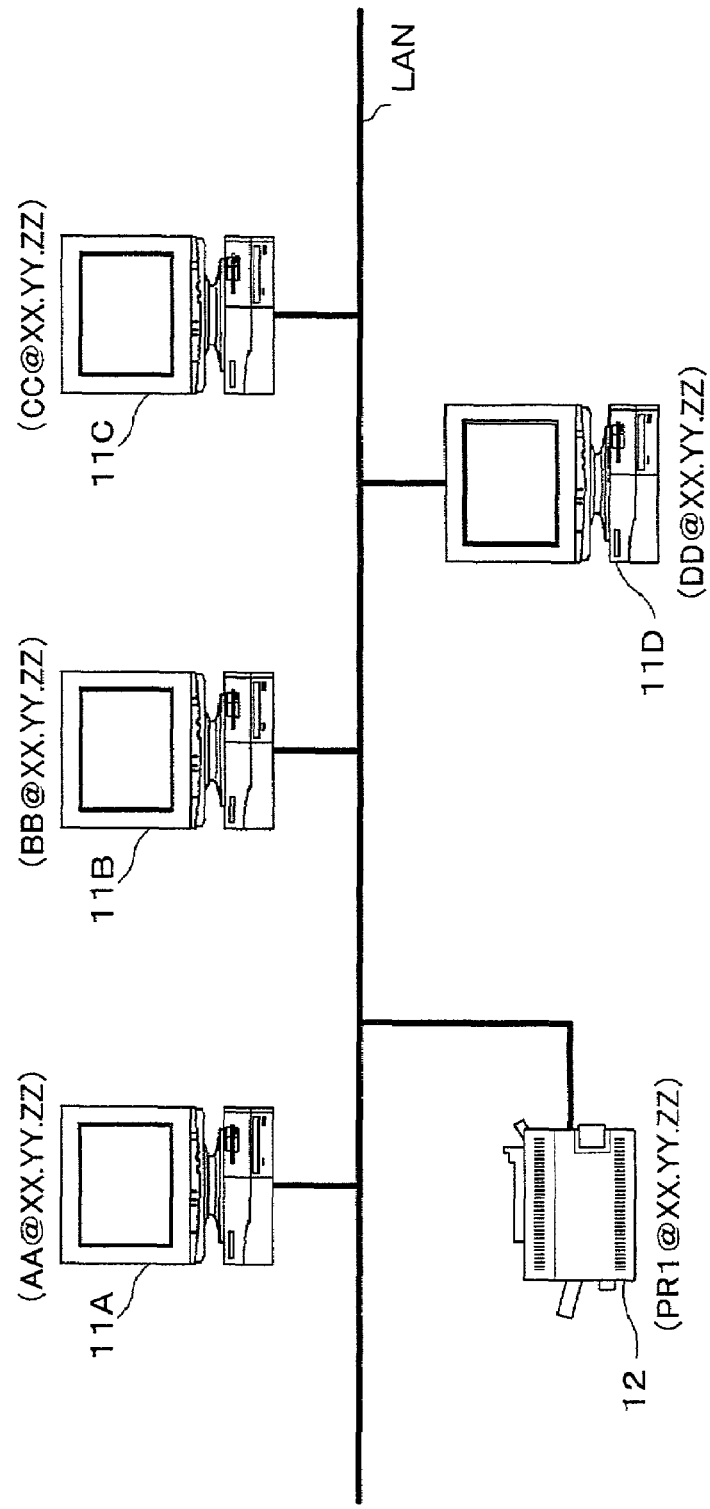
FIG. 2 is an explanatory diagram illustrating a configuration of a printing system including the printer shown in FIG. 1.

FIG. 2 is an explanatory diagram which illustrates a configuration of a printing system in accordance with the present embodiment (hereinafter, referred to as the present system). As described in the figure, the present system includes PCs (Personal Computers; Terminals) 11A to 11D and a printer (a Printing Apparatus) 12 on a LAN (Local Area Network).

The PCs 11A to 11D and printer 12 are given their own E-mail addresses (hereinafter, just referred to as addresses). Thus, as illustrated in FIG. 2, the addresses of PCs 11A to 11D and the printer 12 are AA@XX.YY.ZZ, BB@XX.YY.ZZ, CC@XX.YY.ZZ, DD@XX.YY.ZZ, and PR1@XX.YY.ZZ respectively. The PCs 11A to 11D and the printer 12 are adapted so that data communication (such as transmission and receipt of a printing job or an Email and the like) is carried out on a LAN by specifying the address of a recipient.

Moreover, the PCs 11A to 11D are adapted to output a data file onto sheets (Recording Sheets) to create printing documents by transmitting a printing job that includes printing data (data in a printable format transformed from data files in various formats) to the printer 12.

Furthermore, in the present system, the distribution (Net Distribution) of printing documents through the printer 12 may be carried out among respective users of PCs 11A to 11D. In net distribution, a printing job is sent to the printer 12 for creating the printing documents for the distribution to the other users, while a message (a Distribution Message), which requests them to pick up the printing documents to be output at the printer 12, is delivered to the PCs of the distribution receivers.

Particularly the present system is adapted to transmit the distribution message by the printer 12, and the distribution message is transmitted by E-mail through a LAN. Therefore, the distribution message in the present system will be referred to as a distribution mail hereinafter. Moreover, the printing job for net distribution will be denoted as a distribution job while the printing job not for net distribution will be called an ordinary job. Furthermore, the PC used by a distribution sender of a distribution job will be denoted as a distribution sending PC while the PCs used by distribution receivers of the printing documents are called distribution receiving PCs.

The detailed configuration of the present system is explained below. The PCs 11A to 11D, which are equipped with various software, such as word processing or CAD software and the like, are information processing means for creating and recording data files in accordance with instructions given by users. The PCs 11A to 11D also have functions to create a printing data from the data file, and to create a printing job including the printing data to transmit the job to the printer 12 for printout.

The printer 12 is a printing apparatus for receiving the printing job sent from respective PCs 11A to 11D and for printing out the printing data included in the printing job. Also, the printer 12 is adapted to transmit a distribution mail to distribution receiving PCs when the distribution job from a distribution sending PC is received thereby. Particularly, the printer 12 is adapted to output the printing documents in accordance with a reply (a reply by E-mail: a reply mail) from the distribution receiving PC to answer the distribution mail.

Figure 1:
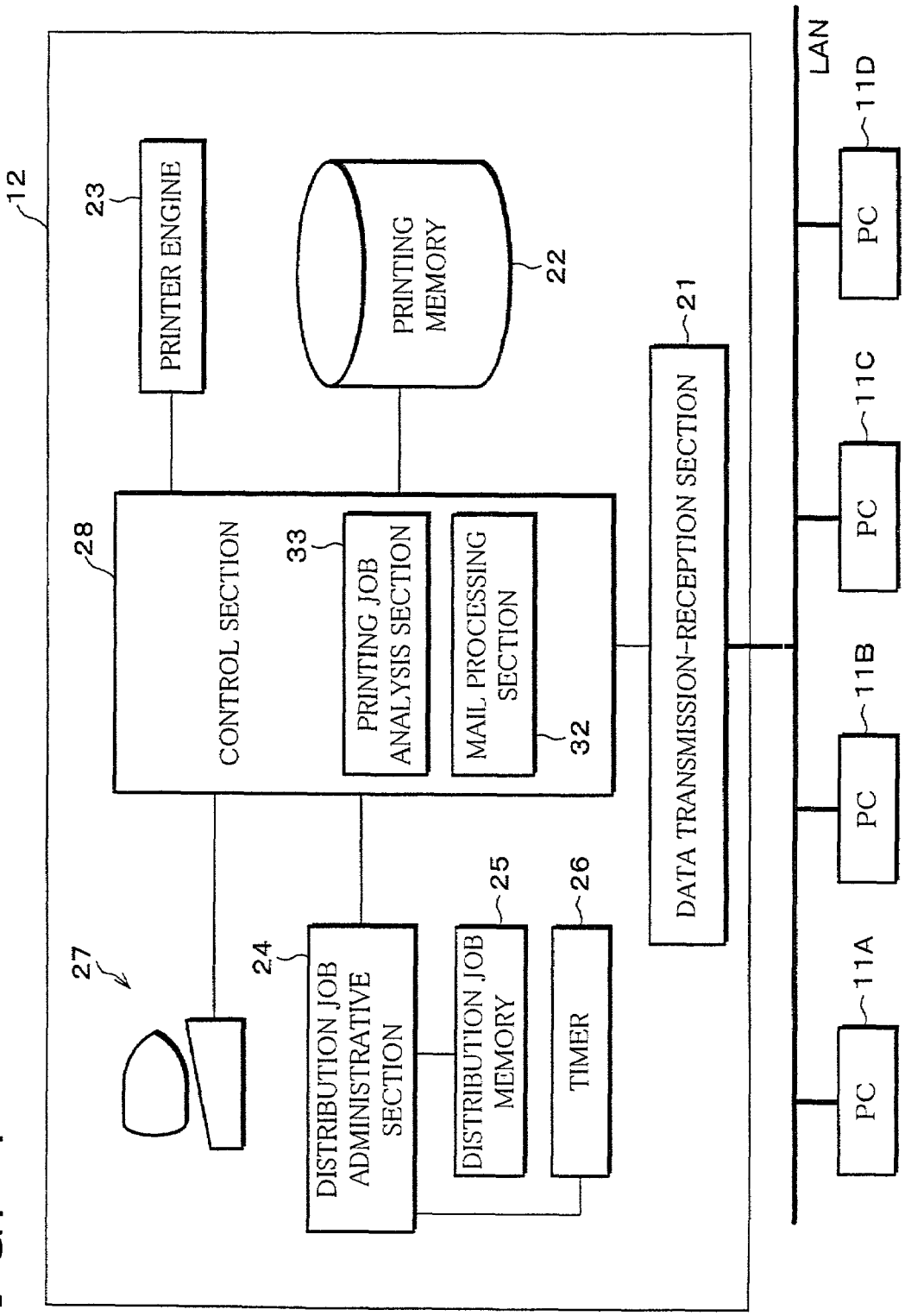
FIG. 1 is an explanatory diagram to showing a configuration of a printer in accordance with one embodiment of the present invention.

FIG. 1 is an explanatory diagram which illustrates a configuration of the printer 12. As shown in the figure, the printer 12 is provided with a data transmission-reception section 21, a printing memory 22, a printer engine 23, a distribution job administrative section 24, a distribution job memory 25, a timer 26, a display device 27 and a control section 28.

The data transmission-reception section (an input section) 21, which is the network interface for the printer 12, performs input-output processing of communication data (an E-mail or a printing job) exchanged between the PCs 11A to 11D and the printer 12.

The printing memory 22 is for storing format data (data for setting a printing format (sheet size, the number of printing pages, the types of printing surfaces, the types of N-up and the like) and printing data contained in a printing job. Moreover, the printer engine (an output section, an engine section) 23 is for creating images on predetermined sheets in accordance with the format data and the printing data. The display device 27, provided with a display panel and an input panel (both not shown here) has functions to display the progress and result of printing process, and to accept the instructions from users.

The distribution job administrative section (a job administrative section and a status informing section) 24 is for the management of the distribution job that is transmitted from a distribution sending PC, while the distribution job memory 25 and the timer 26 are a memory section and a timer utilized for the distribution job administration, respectively. Note that the distribution job administration performed by the distribution job administrative section 24 will be explained later.

The control section (an output section, an output control section, a status informing section) 28, which is the center section of the printer 12, carries out printing process by controlling respective members 21 through 27 of the printer 12. Thus, the control section 28 extracts format data and printing data out of a printing job received by the data transmission-reception section 21 and stores the data in the printing memory 22. In addition, the control section 28 has a function to control the printer engine 23 to perform printing onto sheets. Furthermore, the control section 28 has functions to control the distribution job administrative section 24 for the management of the distribution job by the distribution job administrative section 24 on receipt of a distribution job, and to administrate the transmission and reception of distribution mails and reply mails exchanged between distribution receiving PCs and the printer 12.

Figure 3:
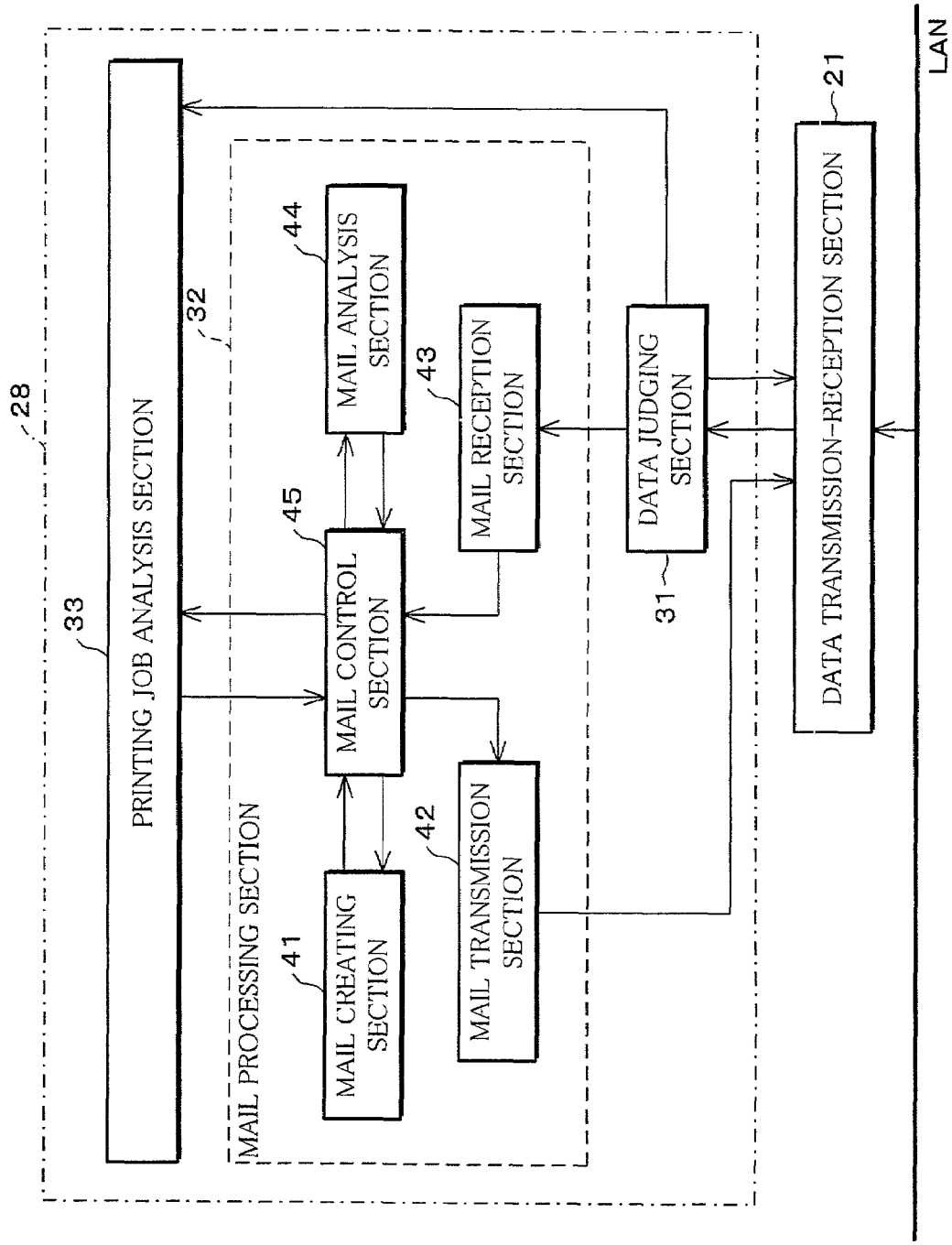
FIG. 3 is an explanatory diagram showing a configuration of a control section provided in the printer shown in FIG. 1.

FIG. 3 is an explanatory diagram showing a configuration of the control section 28. As shown in the figure, the control section 28 is provided with a data judging section 31, a mail processing section 32 and a printing job analysis section 33.

The data judging section 31, upon receipt of communication data received by the data transmission-reception section 21, judges whether the communication data is a printing job or a reply mail from a distribution receiving PC. The data judging section 31 is adapted to transmit a printing job to the printing job analysis section 33, while forwarding a reply mail to the mail processing section 32.

The printing job analysis section (an output section, an output control section, a status informing section) 33 is for extracting format data and printing data out of a printing job and for storing them inside the printing memory 22. The printing job analysis section 33 also has a function to judge whether the printing job transmitted from the data judging section 31 is a distribution job or not.

Figure 4:
FIG. 4 is an explanatory diagram illustrating a configuration of a distribution job transmitted to the printer shown in FIG. 1.

A structure of a printing job is explained in the following. FIG. 4 and FIG. 5 are explanatory diagrams which illustrate a distribution job as an example of a printing job, where PC 11A is a distribution sending PC while PCs 11B to 11D are distribution receiving PCs. As shown in FIG. 4, the printing job is composed of a header J1, format data J2 and printing data J3. FIG. 5 is an explanatory diagram which illustrates the structure of the header J1 shown in FIG. 4. As shown in the figure, the header J1 includes a job data column K1, in which the name (Job Name; NAME) of a printing job is indicated, and a distribution sender data column K2, where the address (Ad) of a distribution sending PC is shown. Moreover, the header J1 also includes a distribution job mark column K3 and distribution receiver data column K4 that indicates the addresses (Ad) of distribution receiving PCs.

Note that, in the distribution job mark column K3, a mark (Distribution Mark;"*" in FIG. 4) is indicated to show that a printing job is a distribution job. Therefore, the distribution job mark column K3 and the distribution receiver data column K4 will be blank for an ordinary job, that is, a job other than a distribution job. This means that the printing job analysis section 33 is adapted to judge the type of a printing job (whether a distribution job or an ordinary job) based on whether the distribution job mark column K3 is with or without the distribution mark. The printing job analysis section 33 is adapted to cause the printer engine 23 to print out the printing data stored in the printing memory 22 without delay in case that the printing job is judged to be an ordinary job.

On the other hand, in case that the printing job is judged as a distribution job, the printing job analysis section 33 creates (or acquires) a job ID, a sender's ID and receiver's IDs, according to the job name and the addresses of the distribution sending PC and the distribution receiving PCs recited in the header J1 of the distribution job. The data (hereinafter, referred to as header information) comprising those IDs and all data of the header J1 are transmitted to the distribution job administrative section 24 (refer to FIG. 1) for the distribution job administration thereby. Moreover, the printing job analysis section 33 is adapted to transmit the header information to the mail processing section 32 for the transmission of distribution mails.

The printing job analysis section 33 is adapted to obtain the contents of a reply mail arrived from a distribution receiving PC to transmit to the distribution job administrative section 24. The printing job analysis section 33 is also adapted to instruct the printer engine 23 to print out the printing data stored in the printing memory 22, according to the contents of the reply mail. Particularly, the printing job analysis section 33 permits the printer engine 23 to carry out printing only when the reply mail contains fixed information (will be mentioned later) and the output of the printing data is requested in the contents of the reply mail.

The mail processing section (a message transmission section and a status informing section) 32, shown in FIG. 3, is provided for identifying the distribution sending PC and the distribution receiving PCs by referring to the header information obtained from the printing job analysis section 33, and for creating distribution mails, while the mail processing section 32 also has a function to send the distribution mails to each distribution receiving PC. The mail processing section 32 also has functions to analyze the contents of a reply mail arrived at the data judging section 31 and to inform the printing job analysis section 33 of the result of the analysis.

A detailed structure of the mail processing section 32 is explained below. As shown in FIG. 3, the mail processing section 32 is provided with a mail creating section 41, a mail transmission section 42, a mail reception section 43, a mail analysis section 44 and a mail control section 45.

The mail creating section 41 is provided for creating a distribution mail to be transmitted to each distribution receiving PC, according to the header information transmitted from the printing job analysis section 33. Moreover, the mail transmission section 42 has a function to transmit a distribution mail, which is created by the mail creating section 41, to the data transmission-reception section 21 (refer to FIG. 1) for sending the mail to each distribution receiving PC.

FIG. 6 is an explanatory diagram showing an example of a distribution mail. The distribution mail given in the figure is what is transmitted to PC 11B in accordance with a distribution job whose sender is PC 11A. It should be noted that the user's names of PCs 11A to 11D are simplified to A to D.

As shown in the figure, stated in the distribution mail are invariable fixed information (Distribution Information) M1 such as a job ID, a job name, distribution receiver's IDs, sheet size and the like for the identification of the distribution job and its distribution receivers (distribution receiving PCs), as well as fixed message M0. Moreover, variable information M2 is stated in the distribution mail for selecting types of printing surface (both faces long sides/both faces short sides), types of N-up (2up or 4up) and whether the printing should be carried out or halted.

Thus, in the present system, the distribution receiver, on receipt of a distribution mail as shown in FIG. 6, sets the contents of the variable information M2 in the distribution mail and sends the mail back to the printer 12 as a reply mail. The mail reception section 43 shown in FIG. 3 is adapted to receive the reply mail of the distribution receiving PC from the data judging section 31, and the mail analysis section 44 is adapted analyze the contents of the fixed information M1 and the variable information M2 in the reply mail.

Moreover, the mail control section 45 is control means to control respective members of the mail processing section 32, namely the sections 41 through 44, for the creation and transmission of a distribution mail and the reception and analysis of a reply mail. Therefore, the mail control section 45 causes the mail creating section 41 to create a distribution mail in accordance with the header information transmitted from the printing job analysis section 33. The mail control section 45 also has a function to control the mail transmission section 42 to carry out the transmission of the distribution mail to the distribution receiving PCs.

Moreover, the mail control section 45 is provided with functions to control the mail analysis section 44 to perform the analysis of the contents of the fixed information M1 and the variable information M2 in the reply mail, and to transmit the result to the printing job analysis section 33. The printing job analysis section 33 then judges whether the contents of the fixed information M1 in the reply mail are relevant or not relevant. The printing job analysis section 33 is adapted to judge it as relevant when the fixed information M1 of the reply mail is identical with the fixed information M1 of the distribution mail sent from the mail processing section 32.

Moreover, the printing job analysis section 33 judges from the contents of the variable information M2 of the reply mail whether the printout is requested or not requested by the distribution receiver, and whether alteration of the format data is also requested. Note that the printing job analysis section 33 is adapted to judge that the alteration of the format data stored in the memory 22 is necessary if there is a difference between the format data and the contents of the variable information M2 column of the reply mail. Then, the printing job analysis section 33 is adapted to control the printer engine 23 to perform the output of the printing data in accordance with the format data.

Explained herein is the distribution job administration performed by the distribution job administrative section 24 (refer to FIG. 1) which administers distribution jobs according to header information and the contents of reply mails received from the printing job analysis section 33 of the control section 28.

That is, the distribution job administrative section 24 is adapted to create a distribution job administrative table (a job administrative table) T1, as shown in FIG. 7, and to store the table in the distribution job memory 25. Note that the job administrative table T1 shown as an example in the Figure is according to the distribution job in which PC 11A is the distribution sending PC and PCs 11B to 11D are set as the distribution receiving PCs.

As shown in the figure, the job administrative table T1 is composed of a printing status column which is for respective distribution receiving PCs and is in accordance with the contents of the reply mails, as well as columns for the job ID, address (Ad) of the distribution sending PC, the distribution sender's ID, the addresses (Ad) of the distribution receiving PCs, and the distribution receiver's IDs, according to the header information. The printing status column will be updated in accordance with the contents of the reply mail from the printing job analysis section 33, stating four kinds of status, namely "NO REPLY MAIL", "PRINTED", "NOT NECESSARY" and "TIME OUT".

Therefore, all the spaces in the printing status column for each distribution receiving PC are set as "NO REPLY MAIL" by the distribution administrative section 24 at the creation of the job administrative table T1 in accordance with the header information, and will be updated to "PRINTED" or "NOT NECESSARY" according to the contents of the variable information M2 column of the reply mail transmitted from each distribution receiving PC.

Time keeping is also carried out by the distribution job administrative section 24 utilizing the timer 26 to measure the time from the distribution mail is dispatched to each distribution receiving PC. The space in the printing status column will be updated to "TIME OUT" for a distribution receiving PC failed to return a reply mail before due time.

When all the spaces in the printing status column for the distribution receiving PCs are updated, completing the output of the printing data for all the distribution receiving PCs that have requested the printout, the distribution job administrative section 24 deletes the job administrative table T1 for the distribution job from the distribution job memory 25. Moreover, at the same time, the distribution job administrative section 24 is adapted to delete the printing data and the format data for the distribution job from the printing memory 22.

The operation of the printer 12 is explained below. To begin with, the receiving operation for a printing job is explained. FIG. 8 is a flow chart which illustrates the operation. As shown, a printing job is received at the data transmission-reception section 21 (S1), then the control section 28 (the printing job analysis section 33) judges whether the printing job is a distribution job or not (S2).

If not a distribution job, the control section 28 (the printing job analysis section 33) controls the printing memory 22 to store the printing data and the format data contained in the printing job. Then the control section 28 controls the printer engine 23 to print out the printing data according to the format data (S3).

On the other hand, if the received printing job is judged as a distribution job in S2, the control section 28 (the printing job analysis section 33) extracts and analyzes the header information of the printing job (S4). Then, the control section 28 (the printing job analysis section 33) transmits the header information extracted from the distribution job to the distribution job administrative section 24. The distribution job administrative section 24 then administrates the distribution job according to the transmitted header information.

Moreover, the control section 28 (the printing job analysis section 33) extracts the format data and the printing data out of the distribution job to store (spool) them in the printing memory 22 (S5). After S5, the control section 28 (the mail processing section 32) creates a distribution mail to transmit to each distribution receiving PC through the data transmission-reception section 21 (S6), terminating the process.

Figure 9:
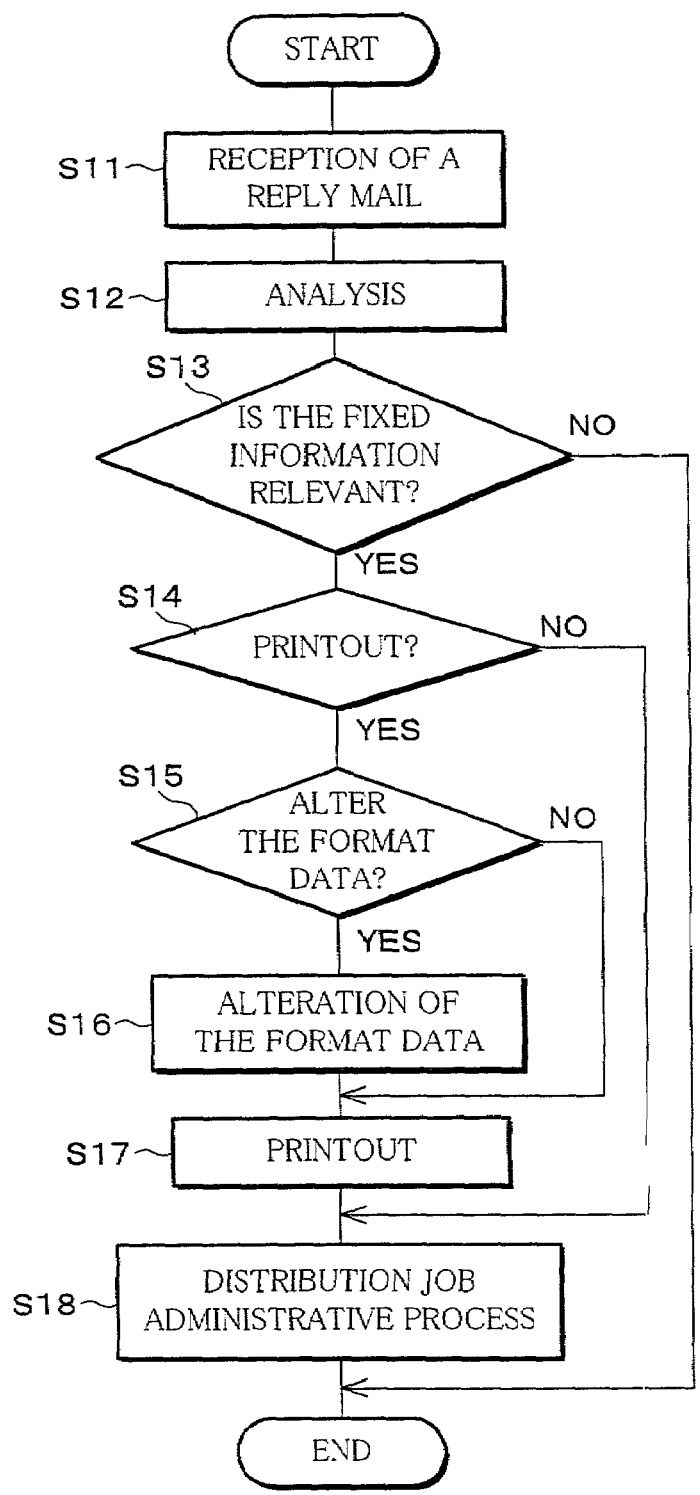
FIG. 9 is a flow chart illustrating a receiving operation for a reply mail by the printer shown in FIG. 1.

The receiving operation for a reply mail is explained in the following. FIG. 9 is a flow chart which illustrates the operation. As shown, the control section 28 (the mail processing section 32) analyzes the reply mail received thereby (S11). Then, the control section 28 (the printing job analysis section 33) judges whether the fixed information M1 of the reply mail is relevant or not. The process is terminated if not relevant (S12, S13).

On the other hand, if the fixed information M1 of the reply mail is judged to be relevant, the control section 28 (the printing job analysis section 33) judges, according to the contents of the variable information M2 column of the reply mail, whether the distribution receiver, who sent the reply mail, is requesting the printout or not (S14).

If it is judged that the printout is requested, the control section 28 (the printing job analysis section 33) controls the printing memory 22 for the readout of the format data and the printing data contained in the distribution job.

After that, the control section 28 (the printing job analysis section 33) judges whether the read-out format data needs some alterations or not, according to the variable information M2 column of the reply mail (S15). In case it is judged that no alteration should be required for the format data, the control section 28 (the printing job analysis section 33) controls the printer engine 23 to printout the printing data according to the read-out format data (S17).

On the other hand, if it is judged that alteration should be required for the format data, the control section 28 (the printing job analysis section 33) alters the format data according to the contents of the variable information M2 column (S16), then controls the printer engine 23 for the printout of the printing data according to the altered format data (S17).

After S17, the control section 28 (the printing job analysis section 33) transmits the contents of the variable information M2 to the distribution job administrative section 24 for updating the space in the printing status column on the job administrative table T1 (refer to FIG. 7) (S18), and completes the process.

As described above, the printer 12 in the present system is adapted so that the control section 28 transmits a distribution mail as shown in FIG. 6 to distribution receiving PCs for the distribution job. It is also adapted to allow the output of the printing documents when a reply mail containing the information identical with the fixed information M1 of the distribution mail is delivered from a distribution receiving PC.

That is, the printing documents cannot be obtained at the printer 12 without inputting the fixed information M1, which is the key word known only to the distribution receivers. This can prevent the acquisition of the printing documents at the printer 12 by users who are not relating to the net distribution. Therefore, even a secret document (an important document or a confidential letter and the like) to be delivered only to specific users may be distributed by net distribution.

Moreover, the printer 12 is so arranged that distribution receivers can transmit printing instructions including relevant fixed information M11 to the printer 12 simply by returning the distribution mail that was transmitted by E-mail. This allows the distribution receivers to give the printer 12 the printing instructions very easily, which contain the relevant fixed information M11.

Furthermore, the printer 12 may be adapted so that a distribution mail containing the fixed information M1 is created in the printer 12 from header information contained in a distribution job. This simplifies the process of creating a distribution mail significantly.

The printer 12 also may be adapted so that format data is changed according to the contents of the variable information M2 in a reply mail. This allows distribution receivers to output printing documents in their desirable format.

Moreover, the printer 12 is provided with the distribution job administrative section 24 that grasps the output status of printing documents for each distribution receiver (each distribution receiving PC). The distribution job administrative section 24 is adapted to delete the printing data and the format data, which are in accordance with the distribution job, from the printing memory 22 when all the spaces of the printing status column for the distribution receivers are updated and the output of the printing data is completed for all the distribution receiving PCs which requested the printout. This prevents the data, no longer necessary after use, from being left in the printing memory 22 over a long period.

Furthermore, printer 12 is adapted so that the printing job analysis section 33 sets job ID, as well as distribution sender's ID and distribution receiver's IDs, in accordance with the contents of a distribution job received from a distribution sending PC. That is, the present system is arranged so that the job IDs and the user's IDs are uniformly managed in the printer 12. This frees the present system from confusion of IDs, for example, distribution jobs with an identical ID are sent to the printer 12 by more than one distribution sending PC. The management of distribution jobs is also carried out easily in the printer 12.

It should be noted that, in the present embodiment, the distribution job administrative section 24 deletes the format data and the printing data of the distribution job from the printing memory 22 when all the spaces in the printing status column for distribution receiving PCs are updated and the output of printing data is completed for all the distribution receiving PCs requesting the printout.

However, the present invention is not limited to the foregoing embodiment, and the control section 28 may be adapted to send a distribution sending PC a printing status mail like the one shown in FIG. 10, based on the instructions given by the distribution job administrative section 24. As the term is used herein, "printing status mail" indicates an E-mail that recites a message for the distribution sender to confirm the printing status and to request the deletion of the distribution job.

The printing status mail is delivered to the distribution sending PC when a distribution mail for a distribution receiving PC is transmitted, and when all the spaces in the printing status column for distribution receiving PCs are updated, and the output of printing data is completed with respect to all the distribution receiving PCs that requested the printout. Alternatively, the printing status mail may be designed to be sent periodically to the distribution sending PC.

As shown in FIG. 10, stated in the printing status mail is, besides fixed-form message M10, the fixed information M11, which is invariable, for specifying distribution jobs and distribution sending PCs (Distribution Senders), such as job IDs, job names, distribution sender's IDs, sheet size and the like. Furthermore, in the printing status mail, recited is variable information M12 for choosing whether to confirm the printing status of the distribution job, and whether to delete the distribution job. That is, in this arrangement, when a distribution sender receives a printing status mail such as the one shown in FIG. 10, he sets the contents of the variable information M12 and returns the mail as a status confirmation mail to the printer 12.

The mail receiving section 43 shown in the FIG. 3 receives the status confirmation mail, which is sent by the distribution sending PC, from the data judging section 31. Then, the contents of the fixed information M11 and the variable information M12 of the status confirmation mail are analyzed by the mail analysis section 44, which in turn transmits them to the printing job analysis section 33.

Then, it is judged by the printing job analysis section 33 whether the contents of the fixed information M11 of the status confirmation mail are relevant or not. Note that the printing job analysis section 33 is adapted to judge that the fixed information M11 of the status confirmation mail is relevant when the fixed information M11 of the printing status mail is identified with that of the status confirmation mail.

After that, the printing job analysis section 33 grasps the contents of the variable information M12 only when the fixed information M11 of the status confirmation mail is judged to be relevant. The printing job analysis section 33 is adapted to control the distribution job administrative section 24 in accordance with the grasped contents to carry out the deletion of the concerned distribution job (the deletion of the job administrative table T1, the format data and the printing data) or the transmission of the printing status (the transmission of the contents of the job administrative table T1 to the distribution sending PC).

This allows the distribution sender to grasp the printing status of the distribution job, which he requested to transmit, by informing of the printing status of the distribution sending PC. Moreover, recommending the deletion of the distribution job prevents the data, no longer necessary after use, from being stored in the printer 12 over a long period.

Furthermore, a distribution sender may want to cancel the distribution of printing documents, for example, when some mistakes are found in the printing documents for the distribution job. In such cases, the cancellation of the distribution of printing documents is carried out easily in the above mentioned configuration because the data of the distribution job can be deleted with ease.

Furthermore, it is preferable that the distribution job administrative section 24 is adapted to request the control section 28 to transmit a mail on the deletion of a distribution job to a distribution sending PC and distribution receiving PCs when the deletion is carried out. This allows the distribution sender to confirm the deletion of the distribution job he sent, furthermore, lets the distribution receivers know that the printing documents are no longer available.

Moreover, in the present embodiment, the output of the printing data of a distribution job is performed only when the contents of the fixed information M1 of a reply mail are relevant and those of the variable information M2 are set to request the printout of the printing data. However, the present invention is not limited to the foregoing embodiment, and the control section 28 (the printing job analysis section 33) may be adapted to perform the printout when predetermined information is input into the display device 27 (refer to the FIG. 1).

FIG. 11 is an explanatory diagram showing how the predetermined information mentioned above is inputted into the input panel of the display device 27. As shown in the figure, in the above-mentioned arrangement, the distribution receivers are allowed to input instructions, which are relating to printout, format data alteration and printout cancellation, into the control section 28 by inputting a job ID and his own user's ID (Distribution Information) correctly into the display device 27 of the printer 12. That is, according to this arrangement, the control section 28 (the printing job analysis section 33) judges whether the job ID and user's ID input into the display device 27 are relevant or not. And the control section 28 (the printing job analysis section 33) is adapted to accept the instructions for printout, format data alteration and whether the printout is necessary or not necessary and to perform the output of the printing data and the updating of the job administrative table T1 (S14 through S18 in FIG. 9) only if the job ID and user's IDs are judged to be relevant.

In this manner, the printing documents can be obtained by the distribution receivers by directly operating the printer 12 without sending a reply mail from each PC 11A to 11D. Furthermore, the requirement of the correct input of the job IDs and user's IDs for the output of the printing data ensures the protection of the printing documents from users who are not set as the distribution receivers.

Furthermore, the present embodiment may be adapted such that the distribution message is transmitted by Email from the printer 12 to the distribution senders. However, the present invention is not limited to the foregoing embodiment, and the transmission of information to the distribution receivers may be carried out by utilizing loudspeaker announcement or communication means such as telephone, facsimile, portable phone, pager or the like. It may be designed that the output of the printing documents is permitted by transmitting and inputting the distribution information, which is available for the users with specific qualifications, into the printer 12. This allows users other than the users of the PCs 11A to 11D to be appointed as distribution receivers.

Similarly, it may be designed that the communication from the printer 12 to a distribution sender (such as for the confirmation of distribution status) is performed by utilizing loudspeaker announcement or other communication means such as telephone, facsimile, portable phone, pager or the like, apart from E-mail.

Further, the present embodiment is adapted to permit the output of the printing documents when the relevant fixed information M1 is contained in the reply mail to be transmitted to the printer 12. However, the present invention is not limited to this, and the output of the printing documents may be allowed when the communication information (information transmitted by E-mail or telephone), which contains other information for the identification of the distribution receiver (such as user's IDs), is transmitted to the printer 12. Further, in the present embodiment, it is designed that the distribution mail containing the fixed information M1 is created by the printer 12 in accordance with the header information included in the distribution job. However, the present invention is not limited to the foregoing embodiment, and the fixed information M1 may be created by the printer 12 from other information than the distribution job. It should be noted that the other information means the information to identify the distribution receiver, for example, the list of distribution receivers, which is installed in the printer 12 in advance, and the like.

Moreover, it is preferable that the control section 28 (a mail processing section 32, a printing job analysis section 33) of the printer 12 is arranged to inform the distribution sender of the distribution job that the distribution mail transmission is completed after the transmission of the distribution mails to the distribution receivers. It is also preferable that the contents of the distribution job (the name and ID of the distribution job, the contents of the printing data, the names and IDs of the distribution receivers and the like) are also informed by the control section 28 at the same time. This allows the distribution sender to administer the distribution job sent by himself.

Furthermore, it is designed in the present embodiment that the distribution message containing the distribution information (the distribution mail including the fixed information M1) is transmitted to the distribution receivers from the printer 12. However, the present invention is not limited to the foregoing embodiment, and the distribution information and the distribution message may be transmitted from the distribution sender to the distribution receivers, while the printer 12 may be adapted to perform the printout when the distribution information transmitted from the distribution sender is included in the E-mail printing instructions sent by the distribution receivers (or in the instructions inputted into the input panel of the display device 27).

Furthermore, in the present embodiment, the printing job analysis section 33 of the printer 12 creates the job ID and the user's IDs from the name of a printing job (Job Information) or the addresses of the distribution sending PC and distribution receiving PCs, which are contained in the distribution job, and utilizes the IDs for creating the distribution mail and administrating the distribution job. However, the present invention is not limited to the foregoing embodiment, and the job ID and the user's IDs may be created (acquired) at the distribution sending PC, and the job ID and the IDs of distribution sender and distribution receivers may be recited in the data columns K1, K2, K4 in the header J1 of the distribution job.

In the present embodiment, the present system is configured with the PCs 11A to 11D and the printer 12 interconnected with each other by means of a LAN. However, the present invention is not limited to the foregoing embodiment, and the present system may be configured with PCs 11A to 11D and the printer 12 connected together by using a larger scale network such as the Internet.

Moreover, the distribution receivers are allowed to choose the types of N-up (2-up or 4-up) in the distribution mail shown in FIG. 6. This N-up means a printing method to print out data equivalent to multiple pages (N pages) on a sheet. Thus, data equivalent to two pages for 2-up and to 4 pages for 4-up may be printed out on one sheet in the method, saving the number of sheets required for printout.

The PCs 11A to 11D are denoted as the terminals in the present embodiment. However, the present invention is not limited to the foregoing embodiment, and they are also possibly called as host devices located on a LAN.

Further, in the present embodiment, the distribution job memory 25 and the timer 26 are controlled by the distribution job administrative section 24. However, the present invention is not limited to the foregoing embodiment, and the control section 28 may control the distribution job memory 25 and the timer 26 by being connected with those sections.

Moreover, the printing job analysis section 33 of the control section 28 may be denoted as a printing job analysis/processing section. Furthermore, a data reception section may be provided in the control section 28 for accepting the communication data transmitted through a LAN. Furthermore, the mail transmission section 42 of the mail processing section 32 in the control section 28 may be adapted to transmit the distribution message directly to the PCs 11A to 11D through a LAN.

It can be said that FIG. 4 and FIG. 5 are examples of the distribution printing job data formats. In addition, it can be called that the job administrative table shown in FIG. 7 is indicative of the memory status of the distribution printing job administrative section (memory).

Further, S13 in FIG. 9 may be the step for judging whether the reply mail is one from a distribution receiving PC or not. It may be arranged that the judgment at S13 to negate the mail as a reply mail from the distribution receiving PC may be followed by S18 for the distribution job administrative process. Moreover, S11 in FIG. 9 may be called as the step for mail reception and ID input while S15 may be called as the step for printing setting alteration. Furthermore, S16 may be described as the step for image processing and setting alteration. Note that the control section 28 may be adapted to control an image processing section, which is not shown here, in S15 in FIG. 9 for the image processing of printing data in accordance with the contents of the variable information M2.

Moreover, the basic arrangement of the printing apparatus of the present invention may be described as a printing apparatus for outputting printing documents according to a printing job transmitted from a terminal, which is adapted to transmit a distribution message to the terminals of distribution receivers to request them to pick up the printing documents on receipt of the distribution job, which is a printing job for distributing the printing documents to the specific distribution receivers.

Further, the printing apparatus of the present invention may be described as a printing apparatus which receives a distribution job that is for the output of printing documents to be distributed to specific distribution receivers from a terminal connected thereto by using a network, and carries out the printing process in accordance with the distribution job, wherein the printing apparatus is adapted to include a message transmission section for sending a distribution message to the terminals of the distribution receivers for requesting them to obtain printing documents, an input section for accepting instructions inputted by distribution receivers, and an output section for outputting printing documents in accordance with the distribution job, the message transmission section including the specific information into the distribution message in order to identify each distribution receiver, and the output section outputting the printing documents according to the distribution job if the input instructions received by the input section contains the specific information.

Moreover, the present invention may be described as the following first to eleventh printing apparatuses. A first apparatus is so arranged that, where the printing apparatus is shared by means of a network, and when a distribution requesting party (distribution sending user) is distributing prints to one or more distribution receivers through the network, the distribution addressees (distribution receivers) are given a notice by E-mail that the printing (print) job from the distribution requesting party is standing by in the printing apparatus, and the printout of the printing job is carried out in accordance with the reply for the E-mail notice. This provides those benefits such as notifying distribution addressees, allowing the distribution addressees to obtain the printing job at their convenience, and not holding the printing matters in the stacker of the printing apparatus.

A second printing apparatus, which is a printing apparatus with functions for transmitting, receiving and analyzing E-mails, is in such an arrangement that, when a printing job for distribution is received, the printing job is analyzed, then the analyzed printing data is stored in a memory, and E-mails addressed for the distribution addressees are created and transmitted, and the printout is performed thereby according to the reply for the transmitted E-mail.

A third printing apparatus, which is a printing apparatus with functions to transmit, receive and analyze E-mails, is so arranged that, when a printing job for distribution is received, the printing job is analyzed, then the analyzed printing data is stored in a memory, and E-mails addressed for the distribution addressees are created and transmitted, and the printout is carried out if the ID stated in the transmitted E-mail is input onto the front panel to instruct the printout.

According to the second and the third printing apparatuses, the burden of the distribution requesting party is reduced by sending E-mails to the distribution addressees. And the printout is sped up by analyzing the data in advance when the printing job is output. Moreover, the use of E-mail eliminates the need of a special system to be installed for the distribution addressee. Furthermore, no printing matters will be held in a stacker unnecessarily and the confidentiality is ensured because the printing job can be output at the will of the distribution addressee. In addition, the confidentiality is further improved by the third printing apparatus because the operation is carried out on the body of the printing apparatus.

A fourth printing apparatus is, in the second printing apparatus or the third printing apparatus, so arranged that when the E-mails for the distribution addressees are created and transmitted, the contents of the printing job are informed to the distribution requesting party by E-mail. This allows the distribution requesting party to administrate the job that he transmitted.

A fifth printing apparatus is, in the fourth printing apparatus, so arranged that the distribution status is informed to the distribution requesting party by E-mail when the confirmation of the distribution status is requested by him. This allows the distribution requesting party to confirm distribution status at his convenience.

A sixth printing apparatus is, in the second printing apparatus or the third printing apparatus, so arranged that when a distribution addressee has not output the printing job even after the due time is passed, the distribution requesting party is informed by E-mail which addressee has not output the printing job. This gives the administration of the distribution status and prevents the printing job from being left in the printing apparatus.

A seventh printing apparatus is, in the sixth printing apparatus, so arranged that the distribution requesting party is allowed to make requests for the deletion of the printing job or the extension of the holding.

An eighth printing apparatus is, in the second printing apparatus or the third printing apparatus, so arranged that the printing job inside the printing apparatus is deleted when the distribution of the printing job is completed after all the distribution addressees have either output the printing job or instructed not to print it out. This prevents the printing job from being left inside the printing apparatus.

A ninth printing apparatus is, in the eighth printing apparatus, so arranged that the deletion of the printing job after the completion of the distribution of the printing job is informed to the distribution requesting party by E-mail. This allows the distribution requesting person to confirm the result of the distribution of the printing job.

A tenth printing apparatus is, in the second printing apparatus or the third printing apparatus, so arranged that the alteration of printing setting may be possible at the time to instruct to start the printout. This gives selection of printing setting to the distribution addressees.

An eleventh printing apparatus is, in the fourth printing apparatus or the seventh printing apparatus, so arranged that the printing job may be deleted if job deletion is requested by the distribution requesting party, and then a notice for the deletion is given by E-mail to the distribution requesting party and the distribution addressees who have not yet expressed their intention as to printing. This gives the confirmation of the deletion of the printing job to the distribution requesting party and lets the distribution addressees know that the printing is no longer available.

It is preferable that the present printing apparatus includes a message transmission section for transmitting a distribution message to each distribution receiver. Furthermore, the message transmission section is preferably adapted to include the specific distribution information in the distribution message. The distribution message is very important for net distribution to be carried out because it recommends the distribution receivers to obtain the printing documents.

In the foregoing arrangement, the message transmission section of the present printing apparatus performs the transmission of the distribution information. This eliminates the need of the transmission of distribution messages by a distribution sender of a distribution job. Moreover, in the above arrangement, the message transmission section includes the distribution information into the distribution message and transmits the distribution message. Therefore, the distribution sender is not required to give another notice to the distribution receivers for the distribution information. Note that, the transmission of the distribution message to the distribution receivers by the message transmission section may be carried out by utilizing loudspeaker announcement or communication means such as telephone, facsimile, portable phone, pager, E-mail and the like.

The message transmission section is preferably adapted to transmit the distribution message for the distribution receivers by E-mail. The arrangement gives a much easier transmission of the distribution message when the terminals of the distribution receivers are in the network.

Moreover, in this case, the input section of the present printing apparatus is preferably adapted to accept the E-mail instructions from the distribution receivers, while the output section is preferably adapted to output the printing documents in accordance with the distribution job when the printing instructions received at the input section are an E-mail reply for the distribution message.

With this arrangement, the distribution receivers can transmit the printing instructions including distribution information to the input section of the present printing apparatus simply by returning the distribution message transmitted thereto by E-mail. This allows the distribution receivers to give printing instructions, which includes the distribution information, in a very simple manner.

It is also possible to provide the body of the present printing apparatus with an input panel, into which user's instructions may be inputted, as its input section. This allows the distribution receivers to obtain the printing documents by directly operating the present printing apparatus. Moreover, in the above arrangement, it is required to input the distribution information directly into the input section with accuracy for the output of the printing documents. This ensures the prevention of the acquisition of the printing documents by a user who is not listed as a distribution receiver.

Furthermore, the message transmission section is preferably adapted to inform the distribution sender of the distribution job, after the transmission of the distribution messages to the distribution receivers, that the transmission of the distribution messages is completed. It is also preferable in this case that the message transmission section informs the contents of the distribution job (the contents of the printing data, the names and IDs of the distribution receivers, and the like) as well. This arrangement allows the distribution sender to administer the distribution job which is sent by himself. In addition, the notice for the distribution sender may be carried out, just like the transmission of the distribution messages for the distribution receivers, by utilizing loudspeaker announcement or communication means such as telephone, facsimile, portable phone, pager or E-mail and the like.

Moreover, it is preferred that the distribution information, as well as the format data and the printing data for setting printing format, is included in the distribution job transmitted to the present printing apparatus, while the message transmission section is preferably adapted to create the distribution message by using the distribution information contained in the distribution job. In this case, for example, the names and IDs of the distribution sender and the distribution receivers, the names and IDs of the distribution job and the like may be used as the distribution information. The process of the creation of the distribution message can be simplified in this arrangement and a faster net distribution can be achieved.

Furthermore, the output section of the present printing apparatus may include a printing memory for storing the printing data and the format data included in the distribution job, an engine section for outputting the printing data on a recording sheet in accordance with the format data, and an output control section. The output control section is provided for reading the printing data and the format data out of the printing memory when the printing instructions containing the distribution information are inputted into the input section so as to cause the engine section to output the printing data in accordance with the format data.

In addition, it is preferable in this case that the input section of the present printing apparatus is adapted to accept instructions for alteration of the format data while the output control section is adapted to alter the format data stored in the printing memory in accordance with the alteration instructions when the alteration instructions including the distribution information are inputted into the input section. Those arrangements allow the distribution receivers to output the printing documents in his preferred format.

Moreover, the present printing apparatus is preferably provided with a job administrative section for grasping the output status of the printing documents for the distribution receivers. And the job administrative section is preferably adapted to delete the format data and the printing data stored in the printing memory at the completion of the output of the printing documents for the distribution receivers. This deletes the data, no longer necessary after use, from the printing memory.

Furthermore, it is also preferable that the job administrative section is adapted to delete the format data and the printing data stored in the printing memory after a predetermined period of time is passed from the transmission of the distribution message by the message transmission section. This prevents the data from being left for a long period, thus effectively utilizing the capacity of the printing memory.

Moreover, the job administrative section is preferably adapted to give a notice for the deletion of the format and the printing data stored in the printing memory to the distribution sender and the distribution receivers of the distribution job when those data are deleted. This allows the distribution sender to confirm the deletion of the distribution job which was sent by him, while letting the distribution receivers know that the printing documents are no longer available. Note that the notice may be given to the distribution sender and the distribution receivers, just like for the transmission of the distribution message, by utilizing loudspeaker announcement or communication means such as telephone, facsimile, portable phone, pager, E-mail and the like.

It is also preferable that the present printing apparatus is provided with a status informing section for grasping the output status of the printing documents for the distribution receivers. And the status informing section is preferably adapted to inform the distribution sender, who sent the distribution job, of the output status grasped thereby. Here, the expression, "the output status of the printing documents (printing status)" means, for example, the names and IDs of the distribution receivers who have inputted the printing instructions (or have not done so yet), the copies of the printing documents actually printed out and the like. This allows the distribution sender to easily confirm the output status of the printing documents relating to the distribution job sent by himself.

It is also preferable that the status informing section is adapted to delete the format data and the printing data stored in the printing memory at the request of the distribution sender of the distribution job. Moreover, the status informing section is preferably adapted to give information on the deletion of the format data and the printing data stored in the printing memory to the distribution sender and the distribution receivers of the distribution job.

This arrangement allows the distribution sender of the distribution job to delete the data of the distribution job by his own decision after confirming the distribution status. In addition, the distribution sender may wish to cancel the distribution of the printing documents, for example, when some mistakes are found in the printing documents of the distribution job. In such cases, the deletion of data of the distribution job may be carried out easily by the distribution sender in the above arrangement. This makes the cancellation of the distribution of the printing documents so simple.

Furthermore, the printing method of the present invention (the present printing method), which is for receiving a distribution job in accordance with the printing documents to be distributed to specific distribution receivers and for outputting the printing documents in accordance with the distribution job, includes the step of outputting the printing documents for the distribution job when printing instructions including specific distribution information are inputted.

The present printing method is the printing method applied to the present printing apparatus mentioned above. Namely, the net distribution of the present printing method is adapted to carry out the printing process only when specific distribution information is included in the printing instructions. Therefore, the acquisition of the printing documents by the users not relating to the net distribution is prevented in the present printing method. Thus, confidential documents which must be delivered to specific distribution receivers may be distributed by means of the net distribution.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A printing apparatus, comprising:
   an input section for receiving a distribution job from a terminal interconnected thereto via a network, the distribution job including information on printing document(s) to be output by the printing apparatus;
   a message transmission section for transmitting a distribution message containing distribution information to at least one distribution receiver as specified by the distribution job, the distribution information corresponding to the distribution job;
   an input section for receiving printing instructions from the distribution receiver(s); and
   an output section for outputting the printing document(s) when the printing instructions are received by the input section from the distribution receiver(s) and the printing instructions include the distribution information corresponding to the distribution job.

2. The printing apparatus as set forth in claim 1, wherein:
   said output section is adapted to output the printing document(s) for the distribution receiver(s) in accordance with the distribution job when the input section receives as distribution information, a user's ID for identifying the distribution receiver(s).

3. The printing apparatus as set forth in claim 1, wherein:
   said output section is adapted to output the printing document(s) for the distribution receiver(s) in accordance with the distribution job when the input section receives as distribution information, a job ID for identifying the distribution job.

4. The printing apparatus as set forth in claim 1, wherein:
   said message transmission section is adapted to transmit the distribution message to a terminal of the distribution receiver(s) by E-mail.

5. The printing apparatus as set forth in claim 1, wherein:
   said input section is an input panel provided to a body of the printing apparatus.

6. The printing apparatus as set forth in claim 1, wherein:
   said message transmission section is adapted to inform a distribution sender of the distribution job that Ihe transmission of the distribution messages is completed, after transmitting the distribution messages to the distribution receiver(s).

7. The printing apparatus as set forth in claim 1, wherein:
the distribution job contains format data, printing data for setting printing format, and distribution information; and
said message transmission section is adapted to create the distribution message by using the distribution information contained in the distribution job.

8. The printing apparatus as set forth in claim 1, wherein:
said message transmission section is adapted to use a user's ID as the distribution information for identification of the distribution receivers; and
said output section is adapted to output the printing documents in accordance with the distribution job when the printing instructions including the user's ID are inputted into the input section.

9. The printing apparatus as set forth in claim 1, wherein:
said message transmission section is adapted to use a job ID as the distribution information for identification of the distribution job; and
said output section is adapted to output the printing documents in accordance with the distribution job when the printing instructions including the job ID are inputted into the input section.

10. The printing apparatus as set forth in claim 4, wherein:
said input section is adapted to accept E-mail instructions from the distribution receiver(s); and
said output section is adapted to output the printing document(s) in accordance with the distribution job when the printing instructions received at the input section are an E-mail reply for the distribution message.

11. The printing apparatus as set forth in claim 7, wherein:
said output section includes:
a printing memory for storing the printing data and the format data contained in the distribution job;
an engine section for outputting the printing data on a recording sheet in accordance with the format data; and
an output control section for reading the printing data and the format data out of the printing memory when the printing instructions including the distribution information are inputted into the input section, so as to cause the engine section to output the printing data in accordance with the format data.

12. The printing apparatus as set forth in claim 11, wherein:
said input section is adapted to accept alteration instructions for the format data; and
said output control section is adapted to alter the format data stored in the printing memory, according to the alteration instructions when the alteration instructions including the distribution information are inputted into the input section.

13. The printing apparatus as set forth in claim 11, comprising: a job administrative section for ascertaining an output status of the printing documents for respective distribution receiver(s), said job administrative section being adapted to delete the format data and the printing data stored in the printing memory at the completion of the output of the printing documents for respective distribution receiver(s).

14. The printing apparatus as set forth in claim 11, comprising:
a status informing section for ascertaining an output status of the printing documents for respective distribution receiver(s), and for giving information of the ascertained output status to a distribution sender of the distribution job.

15. The printing apparatus as set forth in claim 13, wherein:
said job administrative section is adapted to delete the format data and the printing data stored in the printing memory when a predetermined time is passed since the transmission of the distribution messages by the message transmission section.

16. The printing apparatus as set forth in claim 13, wherein:
said job administrative section is adapted to give a notice to a distribution sender and the distribution receiver(s) of the distribution job, informing of the deletion of the format data and the printing data stored in the printing memory.

17. The printing apparatus as set forth in claim 14, wherein:
said status informing section is adapted to delete the format data and the printing data stored in the printing memory at the request of a distribution sender of the distribution job.

18. The printing apparatus as set forth in claim 15, wherein:
said job administrative section is adapted to give a notice to a distribution sender and the distribution receiver(s) of the distribution job, informing of the deletion of the format data and the printing data stored in the printing memory.

19. The printing apparatus as set forth in claim 17, wherein:
said status informing section is adapted to give a notice to a distribution sender and the distribution receiver(s) of the distribution job, informing of the deletion of the format data and the printing data stored in the printing memory.

20. A printing system, comprising:
the printing apparatus set forth in claim 1; and
a plurality of terminals connected to a network to which the printing apparatus is also interconnected.

21. The printing apparatus as set forth in claim 1, wherein there are plurality of distribution receivers.

22. The printing system as set forth in claim 20, wherein there are plurality of distribtition receivers.

23. A printing method executed by a printing apparatus comprising the steps of:
receiving a distribution job from a terminal connected to the printing apparatus via a network, the distribution job including information on printing document(s) to be output by the printing apparatus;
transmitting a distribution message containing distribution information to each of the at least one distribution receiver as specified by the distribution job, the distribution information corresponding to the distribution job; and
outputting the printing document(s) in accordance with the distribution job when printing instructions are received by the printing apparatus from the distribution receiver(s) and the printing instructions include the distribution information corresponding to the distribution job.

24. The printing method as set forth in claim 23, further comprising the step of:
outputting the printing instructions from the at least one distribution receive following receipt of the job distribution message.

25. The printing method as set forth in claim 23, wherein:
there are plurality of distribution receivers, and
said outputting the printing document(s) includes outputting the printing document(s) in accordance with the distribution job when printing instructions including specific distribution information are received from each of the plurality of distribution receiver(s).

26. The printing method as set forth in claim 25, further comprising the step of:
outputting the printing instructions from each of the plurality of distribution receivers following receipt of the job distribution message.

* * * * *